(12) United States Patent
Santisi

(10) Patent No.: US 7,634,842 B2
(45) Date of Patent: Dec. 22, 2009

(54) FASTENING DEVICE

(76) Inventor: Phillip M. Santisi, 11 Foxhurst Rd., Dix Hills, NY (US) 11746

( * ) Notice: Subject to any disclaimer, the term of this patent is extended or adjusted under 35 U.S.C. 154(b) by 0 days.

(21) Appl. No.: 10/615,407

(22) Filed: Jul. 9, 2003

(65) Prior Publication Data

US 2004/0123432 A1   Jul. 1, 2004

Related U.S. Application Data

(60) Provisional application No. 60/394,231, filed on Jul. 9, 2002.

(51) Int. Cl.
*F16G 11/00* (2006.01)
(52) U.S. Cl. ........................ 24/300; 24/131 R
(58) Field of Classification Search ............... 24/598.4, 24/298, 698.3, 265 H, 300–302, 129 R, 130, 24/131 R, 131 C, 129 C; 248/499; 206/478; 410/96, 97, 117; D8/367
See application file for complete search history.

(56) References Cited

U.S. PATENT DOCUMENTS

| 3,328,064 A | * | 6/1967 | Simon ........................ 292/288 |
| 4,694,541 A | | 9/1987 | Skyba |
| 4,827,742 A | | 5/1989 | McDonald |
| 4,831,692 A | | 5/1989 | Chuan |
| 4,842,236 A | * | 6/1989 | Yonts ........................ 248/499 |
| 4,885,824 A | | 12/1989 | Schwab et al. |
| 5,035,558 A | * | 7/1991 | Prosen ........................ 410/96 |
| 5,159,729 A | | 11/1992 | Walker |
| 5,317,788 A | * | 6/1994 | Esposito et al. ............... 24/300 |
| D357,402 S | * | 4/1995 | Roethler ....................... D8/370 |
| 5,423,644 A | | 6/1995 | First et al. |
| 5,603,591 A | | 2/1997 | McLellan |
| 5,722,125 A | * | 3/1998 | Vasilopoulos ................. 24/301 |
| 5,797,167 A | * | 8/1998 | Schwab ....................... 24/16 R |
| 5,809,620 A | * | 9/1998 | Crowley et al. ............... 24/302 |
| 6,113,327 A | * | 9/2000 | Schrader ....................... 410/97 |
| 6,299,396 B1 | | 10/2001 | Chaser |
| 6,322,304 B1 | | 11/2001 | Chaser |
| 6,389,655 B2 | * | 5/2002 | Libecco ....................... 24/300 |
| 6,401,309 B1 | | 6/2002 | Yang |

* cited by examiner

*Primary Examiner*—James R Brittain
(74) *Attorney, Agent, or Firm*—Remenick PLLC

(57) ABSTRACT

A fastening device is disclosed comprising at least a pair of hard hooks, each containing a gripping portion and a hacking portion, connected by a stretchable cord, preferably a bungee cord. The device is useful for easily and securely fastening a ladder or other lengthy equipment to a vehicle.

26 Claims, 6 Drawing Sheets

FASTENING DEVICE

REFERENCE TO RELATED APPLICATIONS

This application claims priority to U.S. Provisional Application No. 60/394,231, entitled "Ladder Bungee" filed Jul. 9, 2002, which is entirely incorporated by reference.

BACKGROUND OF THE INVENTION

1. Field of the Invention

This invention relates to a device comprising a hard clasp that may be connected by one or more cords to another similar clasp. The invention further relates to methods for quickly and easily securing equipment such as ladders and pipes to a rack such as a roof rack of a car or truck, with such clasps.

2. Description of the Background

Various devices and methods are currently being used to securely attach equipment to vehicles. Many of these devices secure equipment to the roof of a vehicle using a roof rack that is attached to the vehicle. Devices for securing equipment to a roof rack include simple implements, such as rope, wire, straps, or standard bungee cords, to more complex apparatus that require professional installation.

The more popular of the simple devices must be wrapped around the equipment, for example a ladder, and the roof rack several times to achieve the desired tautness and then be tied, buckled or hooked on in some place where the small bungee cord hooks will fit. Many devices for securing equipment are made from materials that have poor longevity and wear out after only a few uses or do not withstand the extremes of sun and outdoor temperature variations. Other, more complex securing apparatus are typically professionally installed onto the vehicle or are too complicated to be practical.

Following is a list of several devices for using elastic cords or straps for securing various objects, all of which are specifically and entirely incorporated by reference. U.S. Pat. No. 5,317,788 issued June 1994 to Esposito et al. and U.S. Pat. No. 4,831,692 issued May 1989 to Chuan describes molded plastic hooks for securing an elastic cord or bungee. The molded plastic hooks may break under rigorous conditions and do not provide adequate clearance for attaching to large equipment such as ladders.

U.S. Pat. No. 6,401,309 issued June 2002 to Yang, U.S. Pat. No. 4,885,824 issued December 1989 to Schwab et al., U.S. Pat. No. 5,797,167 issued August 1998 to Schwab, U.S. Pat. No. 4,694,541 issued September 1987 to Skyba, U.S. Pat. No. 5,159,729 issued November 1992 to Walker, U.S. Pat. No. 5,423,644 issued June 1995 to First, et. al. describe hooks for securing a objects using straps or elastic cord, however, these hooks again fail to provide sufficient clearance for easily and securely attaching large equipment, such as ladders.

U.S. Pat. No. 5,603,591 issued February 1997 to McLellan describes a strap for securing objects to a rack on a vehicle. Obtaining sufficient tightness of the straps to hold heavy equipment is difficult. U.S. Pat. No. 6,113,327 issued September 2000 to Schrader also describes a securing apparatus utilizing straps. The apparatus is made part of the cargo or of the rack holding the cargo. U.S. Pat. Nos. 6,322,304 and 6,299,396 issued November 2001 and October 2001 to Chasen and U.S. Pat. No. 4,827,742 issued May 1989 to McDonald describe apparatuses for securing equipment to a vehicle. The apparatuses can not be quickly and easily taken on and off the vehicle.

The drawbacks of the current securing devices facilitated the need for a more convenient and efficient way of tying down equipment, which is accomplished by the present invention.

SUMMARY OF THE INVENTION

The present invention provides devices and methods for easily and securely fixing equipment to a support.

One embodiment of the invention is directed to devices for attaching objects to a fixed surface such as, for example, a roof rack of a vehicle. Preferably, the device includes at least a pair of clasps. Preferably, each clasp includes a handle on one side and a large hook on the other that can be attached to equipment and/or a roof rack. A stretchable cord is used to connect the clasps to one another. Preferably the clasps are made from a hard plastic or metal, more preferably the clasps are made from aluminum or aluminum alloy. Preferably, the stretchable cord is made from a stretchable polymer material; more preferably, the stretchable cord is a bungee cord.

Other embodiments and advantages of the invention are set forth, in part, in the following description and, in part, may be obvious from this description, or may be learned from the practice of the invention.

DESCRIPTION OF THE DRAWINGS

The invention may be understood by reference to either or both the Description of the Invention and the attached Figures.

DESCRIPTION OF THE INVENTION

Figure 1:
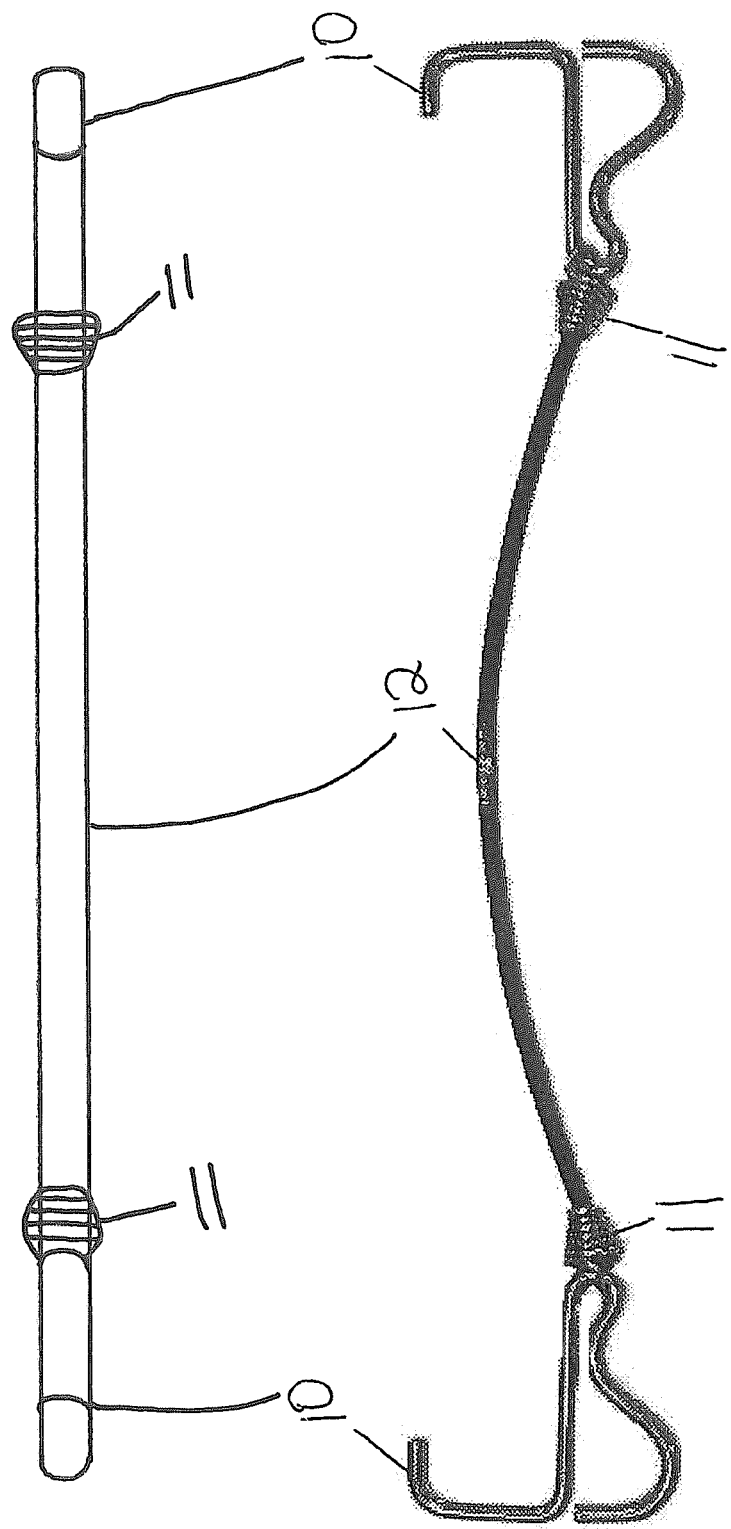
FIG. 1 shows a full view of one embodiment of the invention.

As embodied and broadly described herein, the present invention is directed to devices and methods for easily and securely fixing objects to a specific location. More specifically, the present invention relates to devices for securing a ladder or other large and cumbersome equipment such as pipes, construction equipment, and sports equipment to a roof rack of a vehicle.

Conventional methods of securely attaching equipment to vehicles generally involve complicated and expensive latches, hooks and/or attachments that may be specifically designed for the particular equipment or vehicle. However, to secure miscellaneous equipment inexpensively and quickly has not been possible. Typical methods have involved looping layer after layer of rope or cord around the equipment and a roof rack to ensure a secure fit. This process, although inexpensive, is time consuming and inefficient.

It was surprisingly discovered that a secure and inexpensive device could be constructed from a pair of specifically designed clasps connected by a cord. The most general structure involves a pair of clasps that are formed into a shape that comprises a hook and a grip. The hook is configured to be attached to equipment or a secure attachment point such as a vehicle. A preferred piece of equipment is a ladder or other structured piece of equipment. Preferably, the hook attaches to a secure point on a vehicle such as a roof-rack mounted on the vehicle. The grip is configured to allow secure handling by a user using at least one finger. Preferably, the grip is sized to be gripped by two fingers of the user simultaneously, but may be further modified to contain a three of four fingered grip. Most preferably, the grip is sized to be gripped by the user's index finger and middle finger. Larger versions of the clasp may include a grip large enough to be handled by all five fingers of a user's hand simultaneously.

In another embodiment, the grip can be gripped by a user by bending one or more fingers around the grip. Preferably, the grip provides an opening that is at least ½ of an inch wide, more preferably, at least ¾ of an inch, most preferably, at least one inch wide. To maintain a compact clasp, preferably, the grip provides an opening that is less than four inches wide, more preferably less than three inches wide, most preferably less than two inches wide. For comfort purposes, preferably the grip is curved and rod shaped, but may be ergonomically molded as well.

The hook is preferably sized to firmly attach to a piece of equipment, such as a ladder, or to a rack fitted on a vehicle. Preferably, the hook is formed from multiple straight sections, but can be formed from one or more curved or shaped sections, or combinations thereof. The hook may be curved, shaped or configured to fit to a particular piece or general class of equipment to be secured. Since many pieces of equipment, such as a ladder, pipes, boxes, or other lengthy equipment, and roof racks have flat surfaces that can be used as a connecting surface, having the hook contain one or more straight sections allows the hook to connect to the flat surfaces while maintaining a large area of contact. Providing a large area of contact, whether straight of curved, spreads the force applied by the hook across the connecting surface, minimizing damage to the connecting surface and providing a more secure connection between the hook and the connecting surface. In addition, providing a hook of multiple, straight sections each connected at an angle, permits the hook to easily connect to connecting surfaces that are flat or curved. Angled means that the sections are not connected in a straight line, but angled at each connection. Connection angles may be 30°, 40°, 50°, 60°, 70°, 80°, 90°, 100°, 110°, 120°, 130°, or a combination thereof, but are preferentially perpendicular angles (90°).

Preferably, the sections of the hook are sufficiently sized to fit around one or more connecting surfaces. Preferably, the hook portion of the clasp contains a first section that is at least one inch long. The length of the first section is measured as the length of the surface that is available for contacting a connecting surface. For most applications, the first section is at least two inches long, but may be at least three inches long or longer or shorter. To maintain a compact hook, the first section may be less than eight inches long, or less than seven inches long and preferably less than six inches long. Preferably, the first section is straight.

The hook portion of the clasp may contain a second section that is the same length or shorter than the first straight section. The second section may be at least ¾ of an inch long, or at least one inch long and preferably at least 1½ inches long. The second section may be less than five inches long, or less than four inches long and is preferably less than three inches long. Preferably, the second section is straight or contains multiple straight portions. A second straight section that has multiple portions can be formed by bending the second section.

The first section may be loosely or firmly connected to the second section. To prevent the hook from sliding off of the connecting surface, preferably the first section is approximately perpendicular to the second section. If the second section is formed from multiple portions, preferably a plane running from the beginning of the second section to the end of the second section is perpendicular to the first section.

The hook portion of the clasp contains a third section that is the same length or shorter than the second section. For most applications, the third section is at least ¼ of an inch long, more preferably at least ⅜ of an inch long and most preferably at least ½ of an inch long. For most applications, the third straight section is less than four inches long, such as less than three inches long and can be less than two inches long. Preferably the third section is between two and four inches long. The end of the third section can be bent back into the third straight section or rounded to prevent the hook from scratching.

The second section is connected to the third section either loosely or firmly. To prevent the hook from sliding off of the connecting surface, preferably the second section is perpendicular to the third section. If the second section is formed from multiple portions, preferably a plane running from the beginning of the second section to the end of the second section is perpendicular to the third section.

In addition to a grip and a hook, each clasp may have a cord attachment portion. The cord attachment portion is where a cord attaches to the clasp. In one embodiment, an end loop of the cord attaches to the cord attachment portion by looping around the cord attachment portion. By looping around the cord attachment portion, the cord is able to move within the cord attachment portion. Many means of attachment of cord to cord attachment portion are known to those skilled in the art including, but not limited to a crimp, a knot, a coiled cone, and the like. Preferably, a coil cone can be used to secure the cord to the cord attachment portion. The cord attachment portion is typically curved so that the cord can attach to the clasp at various angles without straining the clasp or the cord. Preferably, the cord attachment section is located on the opposite side of the clasp from the grip.

A pinch portion may separate the grip from the cord attachment portion. The pinch portion may completely seal the grip portion from the cord attachment portion or may be partially closed to provide a restriction that prevents a cord attached to the cord attachment portion from moving into the grip portion.

The clasp may be significantly larger or smaller than the preferred sizes described in detail herein. For example, clasps may be one half, one third, one quarter, one eighth, one tenth, or smaller (section lengths and/or diameters) than preferred sizes described herein. Such clasps are useful for securing small equipment and materials to support where the preferred size would be impractical. Alternatively, clasps may be much larger than preferred sizes described herein such as 2×, 3×, 4×, 5×, 6×, 7×, 8×, 8×, 9×, 10×, or larger (sections lengths and/or diameters), as is practical for an intended use. Accordingly cord lengths may be similarly increased or decreased from preferred lengths and thicknesses to accommodate such uses.

In a preferred embodiment of the invention, all sections of a clasp are aligned in a single plane. In other words, the sections are placed in a single two-dimensional configuration. Alternatively, sections may be configured in one or more parallel planes or in a three dimensional configuration as desired for maximum strength, comfort in grasping, or appearance for marketing purposes. The sections of a clasp may be formed using bending equipment, such as those that include curve dies to form the clasp sections in two-dimensional configuration or one or more parallel planes, or a three dimensional configuration.

The cord is preferably a single stretchable cord of appropriate length and elasticity to secure a single or plurality of ladders or other pieces of equipment, without getting tangled when not in use. However, lengths may vary as needed for the end use. Preferable cords are between 6 and 36 inches in length when not extended, which, if composed of elastic material, may stretch from one to ten feet or more. However, longer cords of un-extended lengths of up to 3, 4, 5, 10, 15 or more feet are clearly envisioned as are shorter cords of un-extended lengths of 18, 10, 8, 6, 4, 2, and less inches. Preferably the cord is elastic and more preferably a bungee type of cord. The cord may also comprise double or triple sections of cord, wherein a terminus of each such section of cord is fixed to one clasp, and the other terminus of each such section of cord is fixed to another second clasp. For added strength, it is envisioned that there could be any number of cords fixed to any number of clasps, depending on the particular use required (e.g. six cords with two or three clasps, eight cords with four clasps, three cords with two clasps, etc.). Cord diameter may be varied and is generally determined by the strength needed for the particular application. Preferred diameters are one quarter inch, one half inch, three quarter inch, and one inch, but can be much more or less as needed or desired.

The cord can be made out of any known cord or cord-like material (natural or artificial materials) and provided in any color or color combination. Cord is preferably made from a stretchable material, many of which are well-known by those skilled in the art and commercially available (e.g. rope, plastic, polymer, rubber, and combinations thereof). More preferably, the cord is a bungee type of cord. The cord may be covered by a material to reduce friction, provide solar protection, provide impact protection or provide protection from sharp surfaces.

Preferably, the clasps are made from rounded and smooth rods of sufficient thickness, and shaped with a handle on one side and a large hook on the other side. The hook can be attached to the vehicle or to the equipment being secured. Preferably, the clasps are formed from a hard plastic or metal such as steel, which may be tempered, brass, iron, an alloy, aluminum, titanium, or combinations thereof. Steel clasps are preferred for heavy duty operations, which strongly resist distortion. Forming the clasps from aluminum or aluminum alloy minimizes the weight of the device while maintaining sufficient strength, and are more appropriate for light duty operations. Forming the clasps from rounded rods provides a good strength to weight ratio and minimizes the damage the clasps inflict on the vehicle, roof rack and/or equipment and forms a comfortable grip.

In an especially preferred embodiment of the invention, each clasp is formed from a single cylindrical rod of steel that is bent into the different portions. Preferably, the rod has a diameter of between $1/16$ and one inch, more preferably between $1/8$ and $3/8$ of an inch, most preferably between $1/8$ and $5/16$ of an inch. Forming the clasps from a single cylindrical rod increases the durability of the clasps. In addition to being formed from bent metal rods, the clasps can also be formed from hardened plastic or metals, each of which can be molded or machined into the desired shape.

Although one pair of clasps connected to each cord is preferred, two pair of clasps or even odd number of clasps (e.g. 3, 5, 7, etc.) can be used as necessary to properly secure equipment or another large structure to a fixed rack, or to provide additional security.

In another embodiment, the device may comprise a plurality of cords, each of which is attached to a single attachment point such as a metal ring, a plastic ring or knotted or otherwise connected to one another. At the other end of one or more of the cords is one or more clasps of the invention. For example, four cords can be attached to a single steel ring on one end, and a clasp on the other. The clasps are attached to the support surface and cover the object to be secured in two or three dimensions. With attachment devices so designed, all sorts and shapes of material can be quickly and easily secured to an object or surface as desired or simply to each other.

Advantages of the device include, but are not limited to, the fact that the device may be used in all types and extremes of weather. The device can be made of components that are resistant to sun, rain and/or snow and cold and/or heat. Further, the device is designed for repeated use as opposed to a single or few uses. By design, the devices of the invention can last for many years without appreciable loss of function or strength.

The following examples are offered to illustrate embodiments of the present invention, but should not be viewed as limiting the scope of the invention.

EXAMPLES OF THE INVENTION

The design and use of the clasps and tie-downs utilizing the clasps can be understood with reference to FIGS. 1-4.

FIG. 1 shows one embodiment of the invention. In FIG. 1, a pair of clasps 10 are connected to a cord 12 by coiled cones 11. Each clasp 10 is preferably made from a single steel rod bent into the appropriate shape. A stretchable cord 12 connects the pair of clasps 10. The cord 12 is preferably a single bungee cord of appropriate length and elasticity to easily secure either singly or doubly stacked ladders without getting tangled when not in use. A cord of from 12 to 18 inches long (e.g. $14\frac{1}{2}$) has been found useful for such a purpose.

Figure 2:
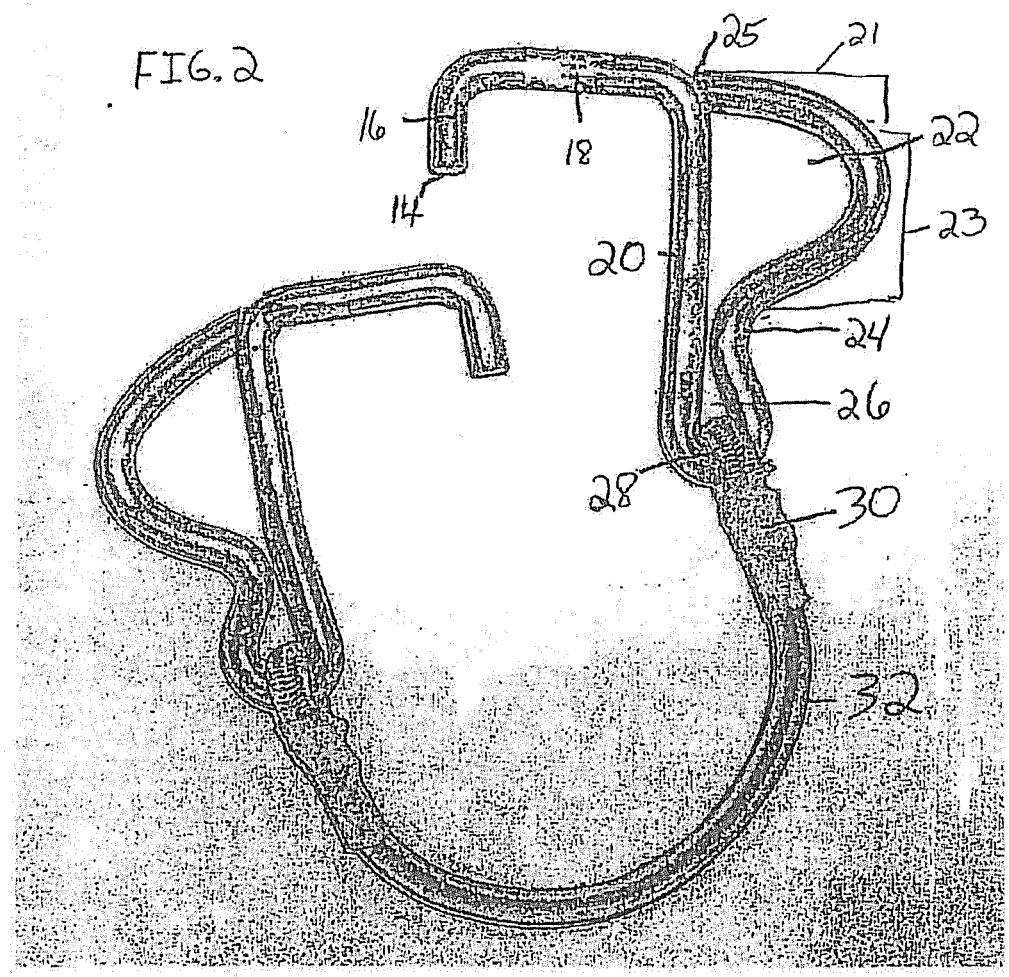
FIG. 2 shows a full view of one embodiment of the invention with many preferred features identified.

Particular portions of the clasps and cord are identified with reference to FIG. 2. The hook portion of the clasp is formed from first hook straight section 20, second hook straight section 18 and third hook straight section 16. The hook formed from the hook straight sections 20, 18 and 16 can support either rounded or squared ladder sections or vehicle racks and is, therefore, superior to a rounded shape which could only support rounded ladder sections or vehicle racks. The end 14 of third straight section 16 is tapered to prevent sharp edges from scratching. Third hook straight section 16 forms a lip that is high enough to properly secure what it is hooked onto, but is not too high to make attaching difficult. The length of second hook straight section 18 is consistent with the length of ladder sections and racks.

The grip 22 is formed by sections 21 and 23. The grip 22 is designed to be grasped like a coffee mug to provide the necessary leverage to safely and easily secure the hook. The grip 22 may be designed to be gripped by one or more fingers or by the entire fist. Grip section 21 terminates at end 25. End 25 may be welded to the hook portion (for example if made of aluminum) to prevent them from coming apart. With steel clasps, welding may not be necessary. The grip section 23 ends at pinch portion 24. Pinch portion 24 separates grip section 22 from cord attachment portion 26. This separation can be complete or partial. The pinch portion 24 need not completely separate grip section 22 from cord attachment portion 26 as long as a cord 32 cannot fit through the pinch portion 24.

A loop 28 of cord 32 is attached to cord attachment portion 26. Cord attachment portion 26 is curved to allow loop 28 to attach to cord attachment portion 26 at multiple angles. Loop 28 is formed by wrapping an end of cord 32 around cord attachment portion 26 and then crimping the end of cord 32. The crimped end of cord 32 is covered by shrink wrap 30 to protect the end from unraveling or becoming un-looped. The pinch portion 24 prevents the loop 28 from moving into grip portion 22. Preferably, the cord is attached to the cord attachment portion of the clasp with a coiled cone apparatus so that shrink wrapping is not necessary.

Figure 3:
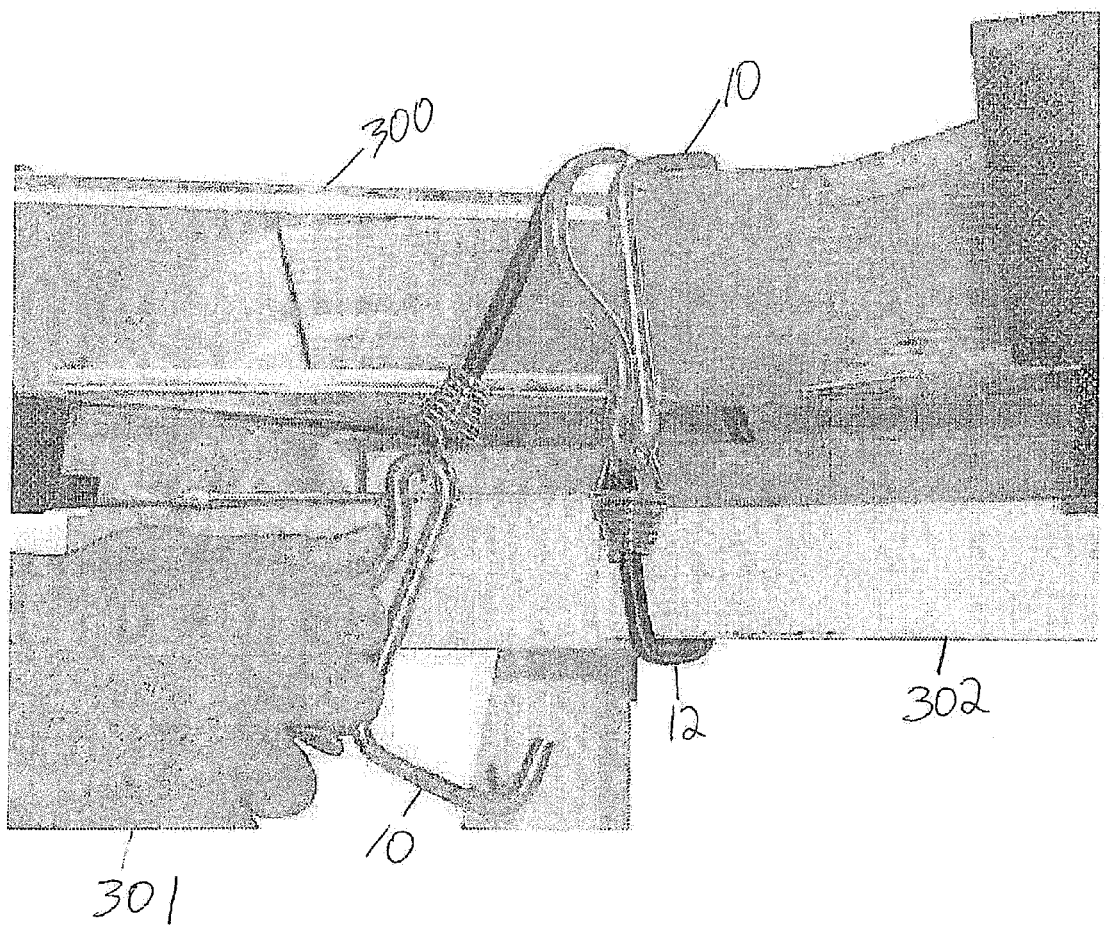
FIG. 3 shows one embodiment of the invention securing a single ladder.

FIG. 3 shows the embodiment of this invention shown in FIG. 1 securing a single ladder 300 to a roof rack 302. In FIG. 3, one clasp 10 is stretched by a user 301 to be attached to a roof rack 302 by engaging the hook portions of clasp 10 with the roof rack 302. The second clasp 10 is engaged with ladder 300. A bungee cord 12 is stretched between the two clasps 10 and firmly holds ladder 300 to roof rack 302. The bungee cord 12 and clasps 10 wrap around the ladder 30 and roof rack 302 one and one half times.

Figure 4:
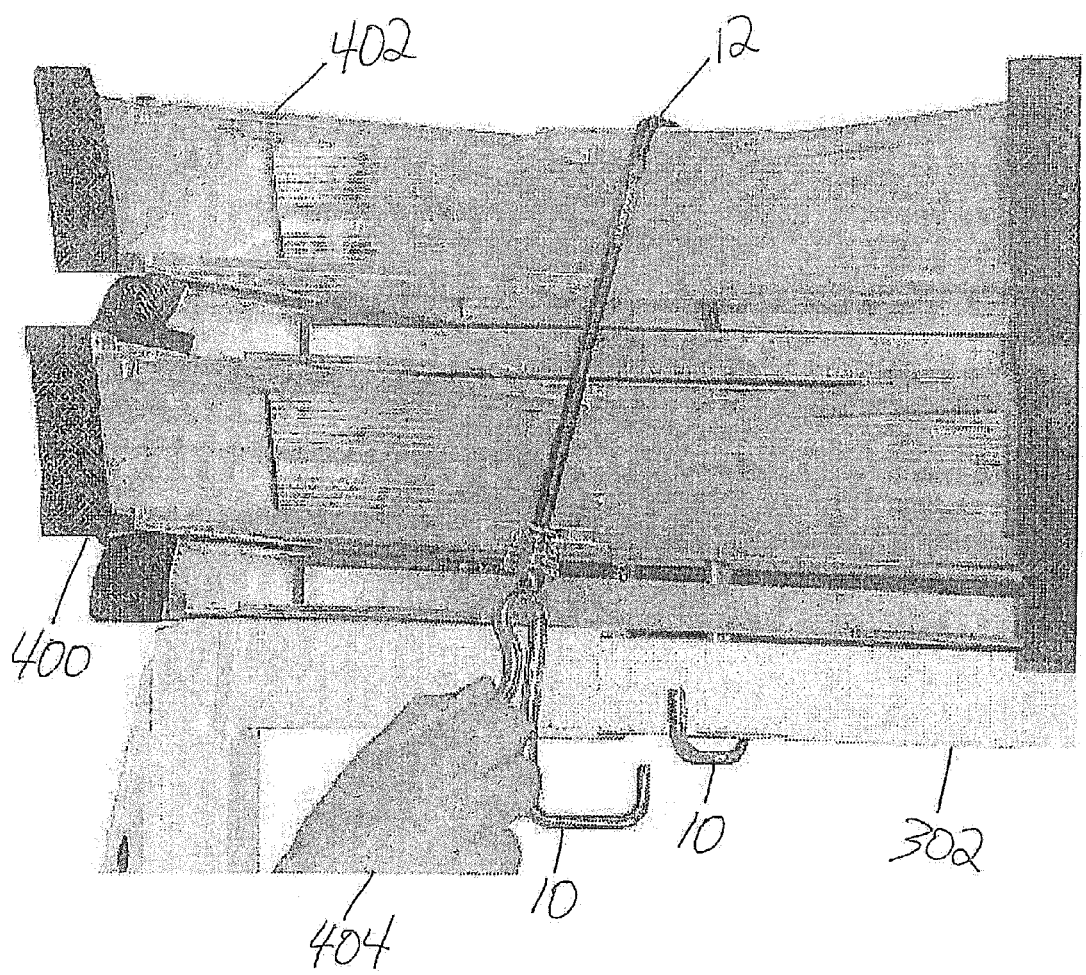
FIG. 4 shows one embodiment of the invention securing two stacked ladders.

FIG. 4 shows the embodiment of this invention shown in FIG. 1 securing two stacked ladders 400 and 402. In FIG. 4, one clasp 10 is connected to roof rack 302. A user 404 is pulling on the grip portion of the second clasp 10 to connect the second clasp 10 to roof rack 302. The bungee cord 12 is stretched around both ladders 400 and 402 securely holding them to roof rack 302. The bungee cord 12 and clasps 10 wrap around the ladders 400 and 402 and roof rack 302 one time. Multiple loops, and the complication that would ensue, are unnecessary.

Figure 5:
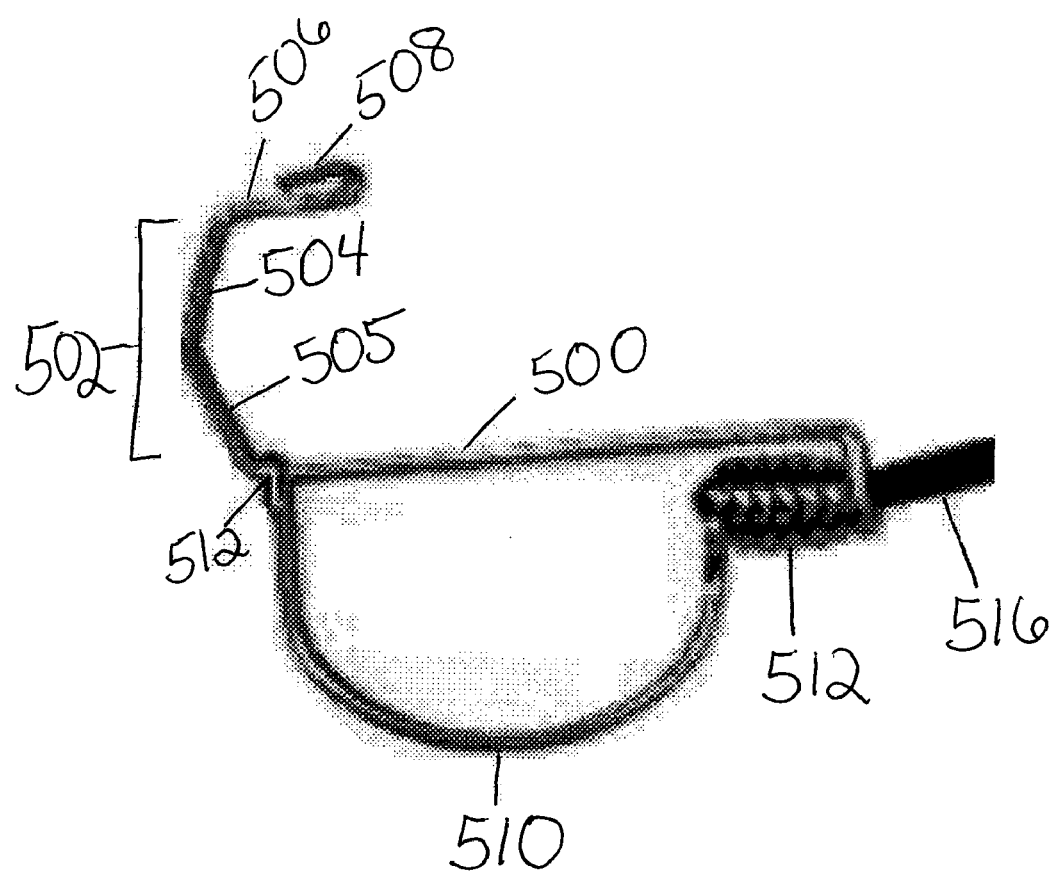
FIG. 5 shows a lighter weight embodiment of the invention.
Figure 6:
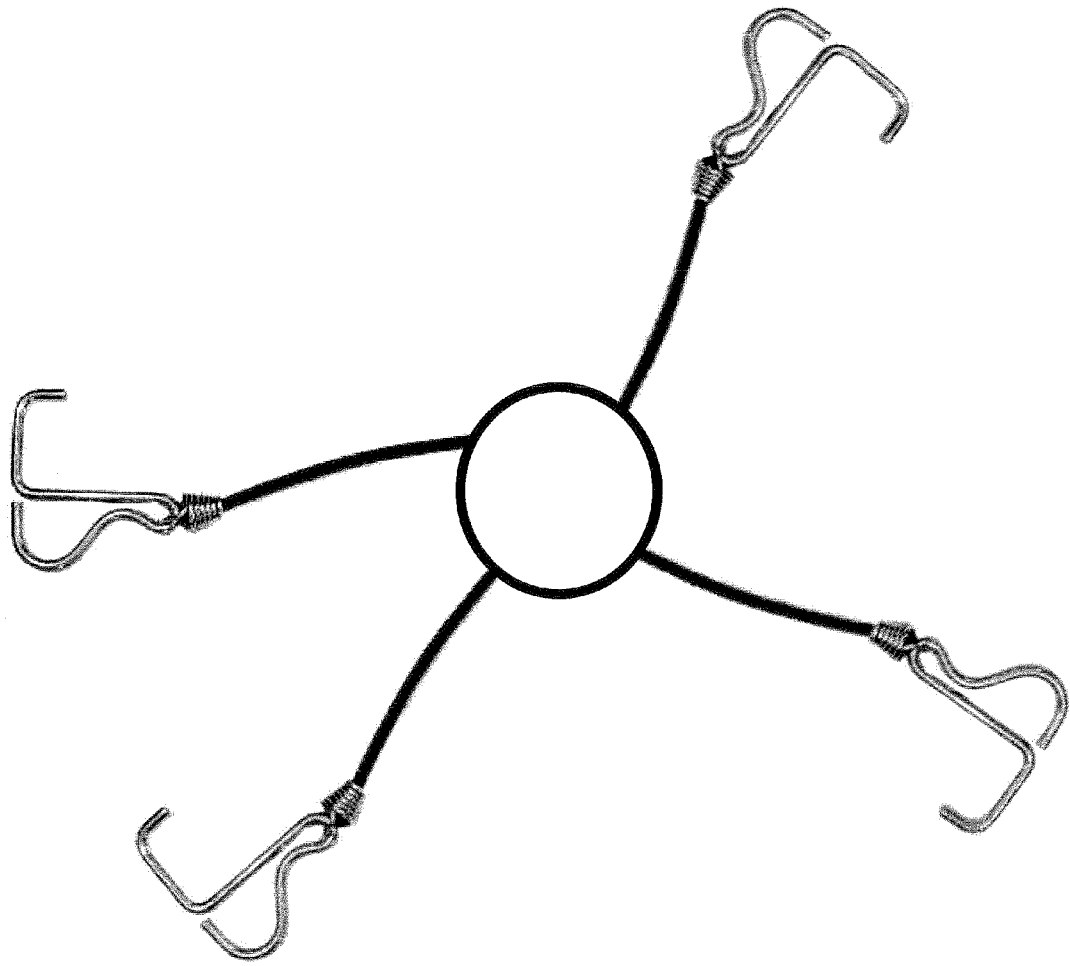
FIG. 6 shows an embodiment having multiple clasps, each attached to a flexible cord, connected to one another via a connection device.

FIG. 5 shows another lighter weight embodiment of this invention. The hook portion of the clasp is formed from first hook section 500, second hook section 502 and third hook section 506. The hook formed from the hook sections 500, 502 and 506 can support either rounded or squared ladder sections or vehicle racks and is, therefore, superior to a rounded shape which could only support rounded ladder sections or vehicle racks. Second section 502 includes two straight section 504 and 505. The end 508 of third straight section 506 is formed by bending back the end of the metal rod to prevent sharp edges from scratching. Third hook straight section 506 forms a lip that is high enough to properly secure what it is hooked onto, but is not too high to make attaching difficult. The length of second hook straight section 502 is consistent with the length of ladder sections and racks.

The grip 510 is designed to be grasped like a coffee mug to provide the necessary leverage to safely and easily secure the hook. The grip may be designed to be gripped by one or more fingers or by the entire fist. Grip section 510 terminates at end 512, which is connected to first hook section 500. End 512 is welded to hook portion 500 to prevent them from coming apart.

A cord 516 is attached to cord attachment portion 512. Cord attachment portion 512 includes a coiled cone that is connected to first hook section 500 and grip 510.

The suggested procedure to secure a singly stacked ladder as shown in FIG. 3 is to drop one clasp behind the ladder and the rack, grab hold on the grip portion of the clasp and pull it around forward and upward to hook it onto the front top of the ladder. Then grab hold on the grip portion of the other clasp and pull it around forward and downward until it hooks onto the bottom of the rack. The end result will be one and a half wrap around with both clasps attached in the front.

The suggested procedure to secure a doubly stacked ladder as shown in FIG. 4 is to drop one clasp behind the ladder and the rack and hook it onto the rack from behind, then grab hold of the grip portion of the other clasp and pull it around forward and downward until it hooks onto the same rack in the same place. The end result will be one complete wrap around with one clasp attached in the front and one clasp attached in the back.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

This application discloses numerical range limitations. Persons skilled in the art will recognize that the numerical ranges disclosed inherently support any range within the disclosed numerical ranges even though a precise range limitation is not stated verbatim in the specification because this invention can be practiced throughout the disclosed numerical ranges and at other numerical ranges which persons skilled in the art will find this invention operable.

Other embodiments and uses of the invention will be apparent to those skilled in the art from consideration of the specification and practice of the invention disclosed herein. All references cited herein, including all written publications, all U.S. and foreign patents and patent applications, and all published statutes and standards, are specifically and entirely incorporated by reference. It is intended that the specification and examples be considered exemplary only with the true scope and spirit of the invention indicated by the following claims.

The invention claimed is:

1. A clasp comprising:
    a hook portion formed from a first section, a second section coupled perpendicularly to a first end of the first section in a first direction, and a third section coupled perpendicularly to a first end of the second section and parallel to the first section;
    a grip portion having a first end adjacent to and coaxial with the second section; and
    an attachment portion having a first end coupled to a second end of the grip portion and a second end coupled, in a second direction opposite from the first direction, to the second end of the first section, wherein the attachment portion and the grip portion are interconnected.

2. The clasp of claim 1, further comprising a cord attached at one terminus of said cord to the attachment portion.

3. The clasp of claim 2, further comprising a second clasp attached to another terminus of said cord.

4. The clasp of claim 2, wherein the cord is stretchable.

5. The clasp of claim 1, wherein the grip portion is ergonomically molded.

6. The clasp of claim 5, wherein the grip portion is ergonomically molded as a curved, rounded rod.

7. The clasp of claim 1, wherein the first section is longer than the second section.

8. The clasp of claim 1, wherein the second section is longer than the third section.

9. The clasp of claim 1, wherein said first, second and third sections are in the same two-dimensional plane.

10. The clasp of claim 1, wherein at least two of said first, second and third sections are in parallel two-dimensional planes.

11. The clasp of claim 1, wherein the clasp is comprised of a material selected from the group consisting of a metal alloy, aluminum, brass, hardened plastic, steel, titanium, and combinations thereof.

12. The clasp of claim 1, wherein the clasp is comprised of steel or aluminum.

13. The clasp of claim 1, wherein a pinch section separates the grip portion from the attachment portion.

14. The clasp of claim 13, wherein the pinch section prevents a cord attached to the attachment portion from entering the grip portion.

15. The clasp of claim 1, wherein the clasp is formed from a single rod.

16. The clasp of claim 15, wherein the single shaped rod is rounded.

17. The clasp of claim 1, wherein the clasp secures equipment to a vehicle.

18. The clasp of claim 1, wherein the clasp attaches to a rack of a vehicle and is capable of securing equipment to the vehicle.

19. The clasp of claim 18, wherein the equipment comprises a ladder.

20. A retaining device, comprising:
  two clasps, wherein each clasp is comprised of:
    a hook portion formed from a first section, a second section coupled perpendicularly to a first end of the first section in a first direction, and a third section coupled perpendicularly to a first end of the second section and parallel to the first portion;
    a grip portion having a first end adjacent to and coaxial with the second section; and
    an attachment portion having a first end coupled to a second end of the grip portion and a second end coupled, in a second direction opposite from the first direction, to the second end of the first section, wherein the attachment portion and the grip portion are interconnected; and
  a cord, wherein a first end of the cord is coupled to the attachment portion of a first clasp and the second end of the cord is coupled to the attachment portion of a second clasp.

21. The device of claim 20, wherein each clasp is formed from a shaped, single, rounded rod.

22. The device of claim 21, wherein the shaped rounded rod of each clasp is comprised of a material selected from the group consisting of a metal allay, aluminum, brass, hardened plastic, steel, titanium, and combinations thereof.

23. The device of claim 20, wherein the cord is a bungee cord.

24. The device of claim 20, wherein the device secures equipment to a vehicle.

25. The device of claim 24, wherein the device attaches to a rack on the vehicle.

26. The device of claim 24, wherein the equipment comprises a ladder.

* * * * *